Patented Jan. 14, 1936

2,028,117

UNITED STATES PATENT OFFICE 2,028,117

MANUFACTURE OF DYESTUFFS AND INTERMEDIATES OF THE DIBENZANTHRONE SERIES

Alexander J. Wuertz, Carrollville, Wis., assignor to E. I. du Pont de Nemours & Company, Wilmington, Del., a corporation of Delaware No Drawing. Application October 23, 1933, Serial No. 694,890

8 Claims. (Cl. 260—61)

This invention relates to the manufacture of dye-stuffs and intermediates of the dibenzanthrone series, and particularly to a process for purifying dihydroxy-dibenzanthrone and its substitution products.

In the preparation of dihydroxy-dibenzanthrone, it has been the practice heretofore to treat the product resulting from the oxidation of dibenzanthrone or the product resulting from the simultaneous ringclosure and oxidation of 2,2'-dibenzanthronyl with sodium bisulfite to remove the excess manganese dioxide used in the oxidation step and to render the product suitable for alkylation. The product from this treatment, however, still contains vat insoluble organic and inorganic impurities. The inorganic material, which consists largely of silica from the manganese dioxide and possibly larger particles of the latter compound itself which have escaped complete reduction by the bisulfite, cause considerable trouble in printing operations. The organic impurities, it has been found, cause blueness and dullness in the shade of the final dyestuff, and also cause considerable difficulty in applying the dyestuff in continuous dyeing processes where evenness in dyeing is essential. Removal of these impurities by filtering the hydrosulfite vat of the compounds is impractical due to the fact that such vats filter very slowly, and often clog the filter completely.

I have now found that when dioxodibenzanthrone, dihydroxy-dibenzanthrone or the substitution products of the latter are reduced in alkaline suspension by boiling with finely divided metals which liberate hydrogen under the conditions of the reaction, the dyestuff is brought into solution, while the organic and inorganic impurities are put in or remain in an insoluble form, whereby they may be separated out by filtration. When the same compounds are vatted with alkaline hydrosulfite, there is no such selective action, and much of the organic material is brought into solution. The organic impurities removed by the use of zinc or equivalent metals, after being freed from such metal, are soluble in alkaline hydrosulfite, and give very dull bluish green dyeings. The dyeings obtained from the product purified by my present method are materially increased in purity and brilliance.

Among the metals which I have found to be useful in this process may be mentioned zinc, aluminum and tin, although it will be obvious that any metal which will liberate hydrogen in alkaline solution under the conditions of this reaction may be used; however, those of an amphoteric nature are preferred. Filtering assistants such as animal charcoal, etc., may be added to the reduction mixture to facilitate filtering.

Caustic soda or caustic potash may be used and the concentration of the alkaline solution may vary within quite wide limits, fixed only, on one hand, by the minimum amount necessary to react with the metal and, on the other hand, by the tendency to salt out the leuco compound at higher concentrations. It is sometimes advantageous to carry out the reduction at one concentration and then dilute to a weaker concentration for filtering. The preferred concentration is in the neighborhood of 2.5 to 5% of alkali. The proportion of alkaline solution relative to the dioxodibenzanthrone may also vary within wide limits, being fixed only by the minimum amount necessary to dissolve the leuco compound on the one hand, and uneconomically large proportions on the other hand. In general, this may vary from 20 to 60 parts of alkaline solution per part of dioxodibenzanthrone. The proportion of metal powder to dioxodibenzanthrone is quite flexible, since large excess may be used without damage. The theoretical minimum proportion is that required to evolve 4 gram atoms of hydrogen per gram molecule of dioxodibenzanthrone. The temperature required varies somewhat with the kind of metal and its state of sub-division, but temperatures of 60 to 100 C. are usually necessary to bring about the reduction. Temperatures of from about 85 to about 100° C. are preferred.

In the preparation of dihydroxy-dibenzanthrone, it is of course not necessary to convert the dioxodibenzanthrone to dihydroxy-dibenzanthrone with sodium bisulfite prior to this purification, for the bisulfite reduction may be dispensed with and the crude dioxodibenzanthrone, as isolated from the oxidation process, may be treated in alkaline solution with the metallic reducing agent, thereby reducing the dioxodibenzanthrone to an alkali-soluble dihydroxy-dibenzanthrone and purifying it in the one operation. The impurities remain or are rendered insoluble thereby and are filtered off.

When the process is used to purify dihydroxy-dibenzanthrone or its substitution derivatives, already prepared by known methods, the vatting with the metallic reducing agent which is in addition to the previous treatment with bisulfite removes those vat-insoluble impurities not removable by hydrosulfite vatting and gives a purer and better color.

The following examples are given to more fully illustrate the principle of my invention:

*Example 1*

10 parts of dibenzanthrone are oxidized according to Example 1 of U. S. Patent No. 1,910,603, but the oxidation mixture is poured into water, filtered and washed acid-free, instead of being treated with bisulfite. The brown colored filter cake is then suspended in 160 parts of water and 35 parts of 40° Bé. caustic soda solution. The mixture is heated to a gentle boil and 5 parts of zinc dust are added in portions during a period of about ¾ hour at a gentle boil. After stirring ½ hour at the boil, 480 parts of hot water are added and the resulting vat is filtered immediately in a closed filter press which is then washed with hot water until the washings come through clear. The blue filtrate is stirred in contact with air until precipitation is complete, and the green precipitate is then filtered off and washed with cold water. The purified dihydroxy-dibenzanthrone thus obtained as the bright green sodium salt is entirely free of inorganic grit and organic impurity of the nature described above, and is especially suitable for the manufacture of dimethoxy-dibenzanthrone.

Caustic potash may be used instead of caustic soda in this example.

*Example 2*

10 parts of 2,2'-dibenzanthronyl are oxidized according to Example 1 of U. S. Patent No. 1,866,501 except that the oxidation mixture is poured into water instead of being filtered. The diluted mixture is filtered and washed free of acid. The brown filter cake is then treated as in Example 1, giving a purified dihydroxy-dibenzanthrone of the same quality as in Example 1.

*Example 3*

A 10% aqueous paste containing 17 parts of crude dimethoxy-dibenzanthrone is digested in 400 parts of water with 87.5 parts of 40° Bé. caustic soda solution, and the whole is then heated to a gentle boil. 12.5 parts of zinc dust are then added in portions during a period of about ¾ hour at the boil, and boiling and stirring are continued for about ½ hour longer. During this time the dyestuff goes into solution, which is then filtered. The insoluble residue, which consists of small amounts of inorganic impurities together with some organic residue, is then removed. The purified dyestuff is isolated from the filtrate by aerating and filtering.

The theory of the selective action described above is not fully understood, but it is believed that while practically all of the organic material present is of vattable nature, the use of metals such as zinc brings about the formation of an insoluble metal salt of the impurity. During the filtration this substance together with the inorganic grit is removed, whereas the soluble vat of dihydroxy-dibenzanthrone passes through in the filtrate.

The above examples, it is to be understood, are given to illustrate my invention and not as limitations thereof, for it will be obvious to those skilled in the art that various modifications of the exact procedure given therein may be made without departing from the spirit of the invention or the scope of the appended claims. In the claims the expression "a dioxy-dibenzanthrone compound" is used in its broadest aspect to designate dioxo-dibenzanthrones, dihydroxy-dibenzanthrones, and alkylated dihydroxy-dibenzanthrones wherein the alkyl group is attached to the dibenzanthrone molecule through the oxygen of the hydroxy group.

What I claim is:

1. In the preparation of dioxy-dibenzanthrone compounds, the step which comprises reacting an impure dioxy-dibenzanthrone compound in alkaline solution in the presence of a metal which in such alkaline solution liberates hydrogen.

2. In the preparation of dioxy-dibenzanthrone compounds, the step which comprises reacting an impure dioxy-dibenzanthrone compound in alkaline solution in the presence of a metal which in such alkaline solution liberates hydrogen, and separating the insoluble material from the alkaline solution.

3. In the preparation of dihydroxy-dibenzanthrone the step which comprises heating dioxo-dibenzanthrone in alkaline solution in the presence of a metal which in such alkaline solution liberates hydrogen, and separating the insoluble material from the alkaline solution.

4. In the preparation of dioxy-dibenzanthrone compounds, the step which comprises heating an impure dioxy-dibenzanthrone compound in caustic alkali solution in the presence of zinc, and separating the insoluble matter remaining after the reaction is complete from the alkaline solution.

5. In the preparation of dioxy-dibenzanthrone compounds, the step which comprises heating an impure dioxy-dibenzanthrone compound in caustic alkali solution in the presence of zinc at 60 to 100° C., and separating the insoluble matter remaining after the reaction is complete from the alkaline solution.

6. In the preparation of dihydroxy-dibenzanthrone, the step which comprises heating dioxo-dibenzanthrone in caustic alkali solution with zinc at 85 to 100° C., and separating the insoluble matter from the solution.

7. In the preparation of dihydroxy-dibenzanthrone the step which comprises heating dioxo-dibenzanthrone in alkaline solution in the presence of a metal which in such alkaline solution liberates hydrogen, and separating the insoluble material from the alkaline solution, and isolating the dihydroxy-dibenzanthrone in the form of its alkali-metal salt.

8. In the preparation of dimethoxy-dibenzanthrone, the steps which comprise heating an impure dimethoxy-dibenzanthrone in an alkaline solution in the presence of a metal which in such alkaline solution liberates hydrogen, and separating the insoluble material from the alkaline solution.

ALEXANDER J. WUERTZ.